(12) United States Patent
Sahara (10) Patent No.: US 9,136,920 B2
(45) Date of Patent: Sep. 15, 2015

(54) RECEPTION APPARATUS AND RECEPTION METHOD

(71) Applicant: KYOCERA CORPORATION, Kyoto (JP)

(72) Inventor: Toru Sahara, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 14/367,377

(22) PCT Filed: Dec. 21, 2012

(86) PCT No.: PCT/JP2012/008204
§ 371 (c)(1),
(2) Date: Jun. 20, 2014

(87) PCT Pub. No.: WO2013/094219
PCT Pub. Date: Jun. 27, 2013

(65) Prior Publication Data
US 2015/0124909 A1    May 7, 2015

(30) Foreign Application Priority Data

Dec. 22, 2011   (JP) .................................. 2011-282236

(51) Int. Cl.
*H04L 27/08* (2006.01)
*H04B 7/04* (2006.01)
(Continued)

(52) U.S. Cl.
CPC .......... *H04B 7/0413* (2013.01); *H04L 25/0202* (2013.01); *H04B 7/0408* (2013.01);
(Continued)

(58) Field of Classification Search
CPC .. H04B 7/0408; H04B 7/0421; H04B 7/0456; H04B 7/0617; H04B 7/0634; H04B 7/0697; H04B 7/0615; H04B 7/0842; H04B 7/086; H04B 7/0865; H04L 25/0202; H04L 27/2601; H04L 27/2647; H04W 52/42
USPC ......... 375/267, 260, 299, 347, 349, 316, 340; 455/101; 370/334
See application file for complete search history.

(56) References Cited

U.S. PATENT DOCUMENTS

2006/0227889 A1* 10/2006 Uchida et al. ................. 375/260
2006/0269006 A1* 11/2006 Kuroda .......................... 375/260
(Continued)

FOREIGN PATENT DOCUMENTS

| JP | 2005-124125 A | 5/2005 |
| JP | 2008-17143 A | 1/2008 |
| JP | 2008-252301 A | 10/2008 |
| JP | 2011-71918 A | 4/2011 |

OTHER PUBLICATIONS

International Search Report; PCT/JP2012/008204; Mar. 12, 2013.
(Continued)

*Primary Examiner* — Leila Malek
(74) *Attorney, Agent, or Firm* — Studebaker & Brackett PC (57) ABSTRACT

A reception apparatus obtains a first channel estimated value from a reference signal of each layer and a known reference signal that are received and multiplies the first channel estimated value by an orthogonal signal sequence in each layer. Subsequently, the reception apparatus synthesizes a signal in each layer and, from the orthogonal signal sequence and the synthesized signal, calculates an adaptive array antenna weight. Next, the reception apparatus carries out antenna synthesis of the data signal and the reference signal by using the above weight for each layer and obtains a second channel estimated value from the reference signal subjected to the synthesis. Then, the reception apparatus carries out MIMO demodulation from a result of the channel estimation for each layer described above.

6 Claims, 4 Drawing Sheets

(51) Int. Cl.
*H04L 25/02* (2006.01)
*H04B 7/06* (2006.01)
*H04W 52/42* (2009.01)
*H04B 7/08* (2006.01)
*H04L 27/26* (2006.01)

(52) U.S. Cl.
CPC ............ *H04B7/0421* (2013.01); *H04B 7/0456* (2013.01); *H04B 7/0615* (2013.01); *H04B 7/0617* (2013.01); *H04B 7/0634* (2013.01); *H04B 7/0697* (2013.01); *H04B 7/086* (2013.01); *H04B 7/0842* (2013.01); *H04B 7/0865* (2013.01); *H04L 27/2601* (2013.01); *H04L 27/2647* (2013.01); *H04W 52/42* (2013.01)

(56) References Cited

U.S. PATENT DOCUMENTS

2007/0253501 A1* 11/2007 Yamaura ..................... 375/262
2007/0258541 A1* 11/2007 Yamaura ..................... 375/267
2008/0008258 A1    1/2008 Tanabe
2011/0176420 A1*  7/2011 Shiotsuki et al. ............. 370/235
2012/0177140 A1    7/2012 Sahara

OTHER PUBLICATIONS

3GPP TS 36.211 V8.9.0 (Dec. 2009); 3rd Generation Partnership Project; Technical Specification Group Radio Access Network; Evolved Universal Terrestrial Radio Access (E-UTRA); Physical Channels and Modulation (Release 8).

* cited by examiner

RECEPTION APPARATUS AND RECEPTION METHOD

CROSS REFERENCE TO RELATED APPLICATION

This application claims priority to and the benefit of Japanese Patent Application No. 2011-282236 (filed on Dec. 22, 2011), the entire contents of which are incorporated herein by reference.

TECHNICAL FIELD

The present invention relates to a reception apparatus and a reception method used in a radio communication system capable of carrying out a MIMO communication.

BACKGROUND ART

In a radio communication system that employs OFDM (Orthogonal Frequency Division Multiplexing) such as LTE (Long Term Evolution) standardized by 3GPP (Third Generation Partnership Project), MIMO (Multiple Input Multiple Output) may be employed. In carrying out the MIMO employing SFBC (Space Frequency Block Coding) or spatial multiplexing, in consideration of MIMO demodulation at a receiving side, a sending side transmits a radio signal in a manner such that a frequency and time of known reference signals transmitted in each layer do not overlap each other.

RELATED ART DOCUMENT

Non-Patent Document

Non-Patent Document 1: 3GPP TS 36.211 V.8.9.0 "Physical channels and modulation", December 2009

SUMMARY OF INVENTION

Technical Problem

For the radio communication system as described above, employment of an adaptive array system has been considered. However, when the adaptive array system is employed, since the reference signals described above are not multiplexed at the same time and at the same frequency, null steering may not be appropriately carried out to different layers.

An object of the present invention in consideration of such a problem is to provide a reception apparatus and a reception method used in the radio communication system employing MIMO capable of appropriately carrying out the null steering to different layers and thus improving communication quality.

Solution to Problem

In order to achieve the above object, a reception apparatus according to the present invention having a plurality of reception antennas used in a radio communication system capable of carrying out a MIMO communication, the reception apparatus includes: a means for receiving, at each of the reception antennas, a radio signal of a plurality of data streams that is transmitted from each of a plurality of transmission antennas of a transmission device and includes reference signals whose transmission timings and transmission frequencies are different from one another; a means for calculating a first channel estimated value of each of the data streams based on each of the reference signals and a known reference signal; a means for calculating values associated with the reference signals of each of the data streams based on the first channel estimated value and a predetermined value; a means for combining the values associated with the reference signals of each of the data streams; a means for calculating a reception weight to each of the data stream of each of the reception antennas based on a result of the synthesis; a means for carrying out, by using the reception weight, antenna synthesis of the radio signal of each of the data streams; a means for calculating a second channel estimated value of each of the data streams from the reference signal subjected to the synthesis; and a means for obtaining received data by carrying out MIMO demodulation by using the second channel estimated value of each of the data streams.

Preferably, the means for combining the values associated with the reference signals combines at least a value associated with a first reference signal of a first data stream and a value associated with a second reference signal of a second data stream having the same transmission frequency and proximate to the first reference signal in a time axis direction.

Alternatively, the means for combining the values associated with the reference signals combines at least the value associated with the first reference signal of the first data stream and a value associated with the second reference signal of the second data stream having the same transmission timing and proximate to the first reference signal in a frequency axis direction.

Preferably, the MIMO communication employs an SFBC scheme or a spatial multiplexing scheme.

Preferably, the predetermined value is a value representing an orthogonal sequence as an orthogonal reference signal corresponding to each of the data streams.

Also, a reception method of a reception apparatus having a plurality of reception antennas in a radio communication system capable of carrying out a MIMO communication, the reception method includes: a step of receiving, at each of the reception antennas, a radio signal of a plurality of data streams that is transmitted from each of a plurality of transmission antennas of a transmission device and includes reference signals whose transmission timings and transmission frequencies are different from one another; a step of calculating a first channel estimated value of each of the data streams based on each of the reference signals and a known reference signal; a step of calculating values associated with the reference signals of each of the data streams based on the first channel estimated value and a predetermined value; a step of combining the values associated with the reference signals of each of the data streams; a step of calculating a reception weight to each of the data streams of each of the reception antennas based on a result of the combining; a step of carrying out, by using the reception weight calculated, antenna synthesis of the radio signal of each of the data streams; a step of calculating a second channel estimated value of each of the data streams from the reference signal subjected to the synthesis; and a step of obtaining received data by carrying out MIMO demodulation by using the second channel estimated value of each of the data streams.

Effect of the Invention

According to the present invention, in the radio communication system employing MIMO, null steering may be appropriately carried out to different layers and thus communication quality may be improved.

DESCRIPTION OF EMBODIMENT

Figure 1:
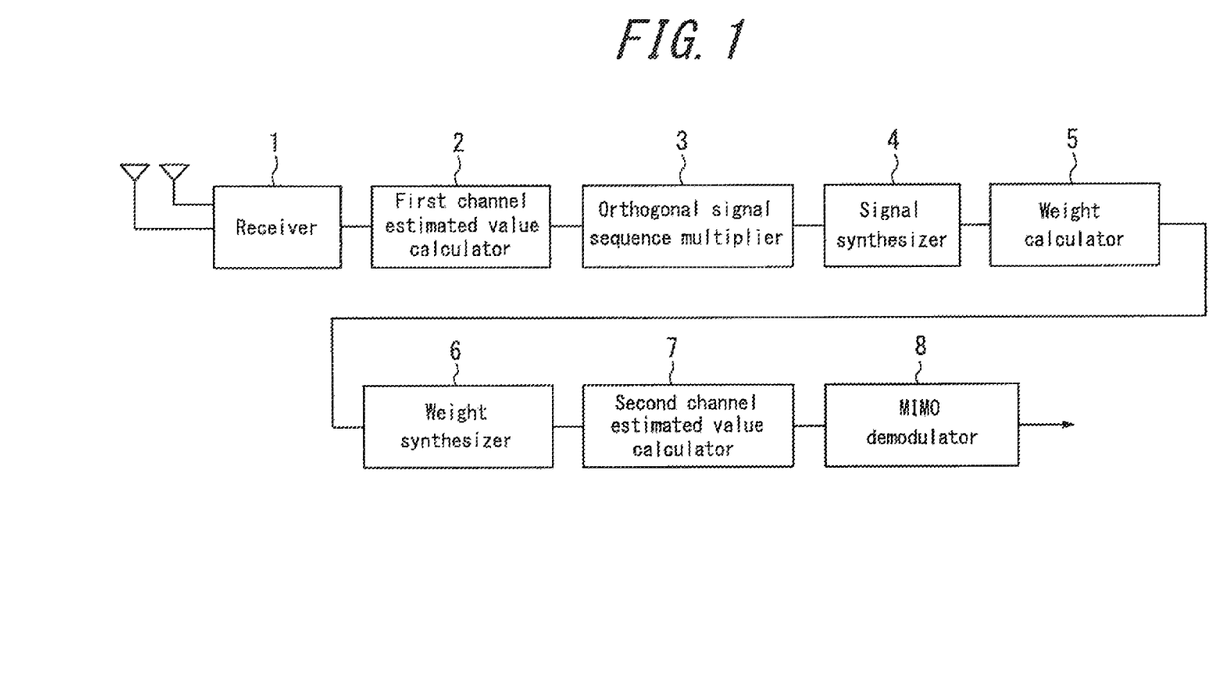
FIG. 1 is a block diagram of a signal processing unit of a reception apparatus according to an embodiment of the present invention.

Hereinafter, an embodiment of the present invention will be described with reference to the accompanying drawings. FIG. 1 is a block diagram of a signal processing unit of a reception apparatus according to the embodiment of the present invention. The reception apparatus according to the embodiment of the present invention is used in a radio communication system capable of carrying out a MIMO communication and includes a receiver 1, a first channel estimated value calculator 2, an orthogonal signal sequence multiplier 3, a signal synthesizer 4, a weight calculator 5, a weight synthesizer 6, a second channel estimated value calculator 7, and a MIMO demodulator 8.

The receiver 1 includes a plurality of reception antennas and receives, at each of the reception antennas, a radio signal of a plurality of data streams (layers) that is transmitted from each of a plurality of transmission antennas of a transmission apparatus and includes reference signals whose transmission timings and transmission frequencies are different from one another. The first channel estimated value calculator 2 calculates a first channel estimated value of each of the data streams based on the reference signals received and a known reference signal.

The orthogonal signal sequence multiplier 3 calculates, based on the first channel estimated value calculated and an orthogonal sequence (a predetermined value) as an orthogonal reference signal, values associated with the reference signals of each of the data streams. The signal synthesizer 4 synthesizes (combines) the values associated with the reference signals of each of the data streams. Note that, preferably, the signal synthesizer 4 synthesizes (combines) at least a value associated with a first reference signal of a first data stream and a value associated with a second reference signal of a second data stream having the same transmission frequency and proximate to the first reference signal in a time axis direction.

The weight calculator 5 calculates a reception weight applied to each of the data streams received at each of the reception antennas based on a result of the synthesis. The weight synthesizer 6 carries out, by using the reception weight, antenna synthesis of the radio signal of each of the data streams.

The second channel estimated value calculator 7 calculates a second channel estimated value of each of the data streams from the reference signal having been subjected to the synthesis. The MIMO demodulator 8 carries out MIMO demodulation by using the second channel estimated value of each of the data streams and thus obtains received data.

Figure 2:
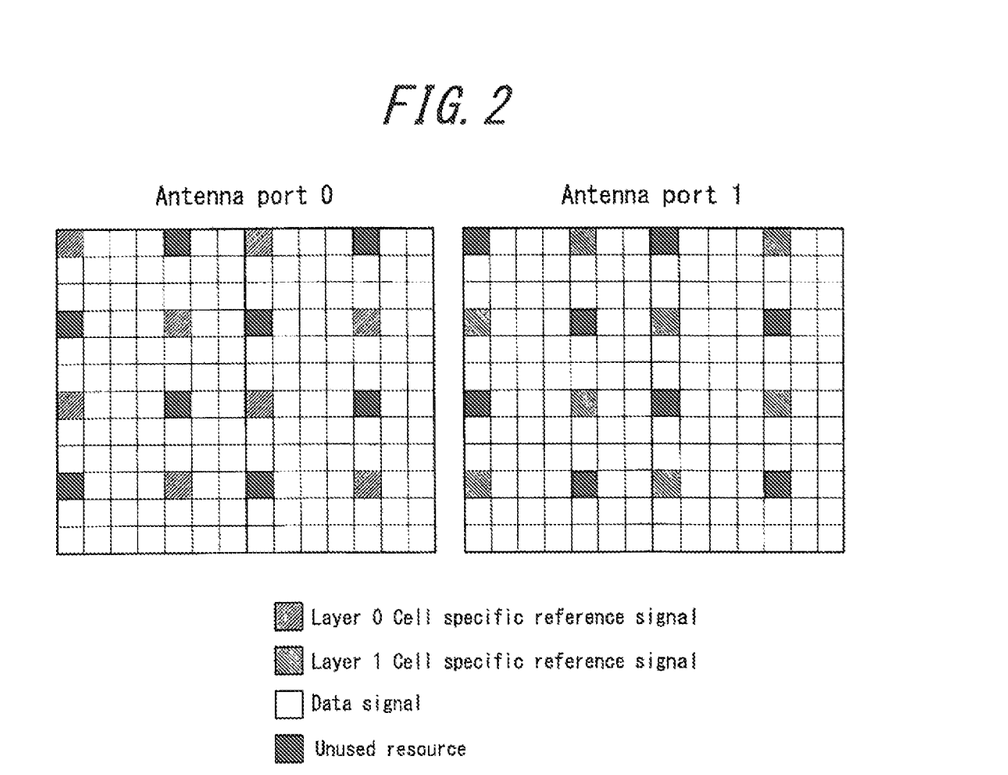
FIG. 2 is a diagram illustrating an example of transmission of a cell specific reference signal of each layer when MIMO is employed by LTE.

FIG. 2 is a diagram illustrating an example of transmission of a cell specific reference signal of each of the data streams (layers) when LTE employs MIMO. FIG. 2 illustrates an example of two antenna ports, in which the reference signals in each layer are prevented from being spatially multiplexed at the same time and at the same frequency.

Figure 3:
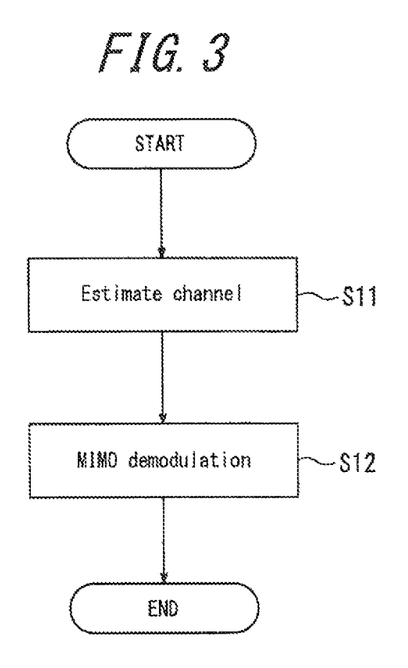
FIG. 3 is a flowchart illustrating an operation of a conventional reception apparatus.

FIG. 3 is a flowchart illustrating an operation of a conventional reception apparatus when MIMO is employed. The conventional reception apparatus, from the reference signals of each layer of the received signal (see FIG. 2), estimates a channel (step S11) and, from a result of the channel estimation for each layer as described above, carries out MIMO demodulation (step S12).

A specific example of a conventional calculation will be described by using SFBC 2×2 of LTE as an example. First, two antennas on a transmission side and one antenna on a reception side will be described. Formula 1 described below represents a received signal at the antennas on the reception side.

$$\begin{bmatrix} Y_1(f1) \\ Y_1(f2) \end{bmatrix} = \begin{bmatrix} S_1(f1) & S_1(f2) \\ -S_1^*(f2) & S_1^*(f1) \end{bmatrix} \begin{bmatrix} H_1(f1) \\ H_1(f2) \end{bmatrix} + \begin{bmatrix} n_1(f1) \\ n_1(f2) \end{bmatrix} \quad \text{[Formula 1]}$$

Here, Y and S represent the received signal and a transmission signal, respectively, and both f1 and f2 represent frequencies. H represents propagation path information (a value actually used is a result of propagation path estimation for reception), and n represents Gaussian noise. Also, an asterisk (*) represents complex conjugate. Since it is desired to obtain $S_1(f1)$ and $S_1(f2)$ eventually, the above formula is changed by multiplying both members of $Y_1(f2)$ by the complex conjugate of $Y_1(f2)$ as shown in Formula 2.

$$\begin{bmatrix} Y_1(f1) \\ Y_1^*(f2) \end{bmatrix} = \begin{bmatrix} H_1(f1) & H_1(f2) \\ H_1^*(f2) & -H_1^*(1) \end{bmatrix} \begin{bmatrix} S_1(f1) \\ S_1(f2) \end{bmatrix} + \begin{bmatrix} n_1(f1) \\ n_1^*(f2) \end{bmatrix} \quad \text{[Formula 2]}$$

Both members of Formula 2 are multiplied by an inverse matrix of $$\begin{bmatrix} H_1(f1) & H_1(f2) \\ H_1^*(f2) & -H_1^*(f1) \end{bmatrix} \quad \text{[Formula 3]}$$

to summarize the expression to $$\begin{bmatrix} \hat{S}_1(f1) \\ \hat{S}_2(f2) \end{bmatrix} = \begin{bmatrix} H_1(f1) & H_1(f2) \\ H_1^*(f2) & -H_1^*(f1) \end{bmatrix}^{-1} \begin{bmatrix} Y_1(f1) \\ Y_1^*(f2) \end{bmatrix} \quad \text{[Formula 4]}$$

Here, the following formula $$\hat{S}_1(f1), \hat{S}_1(f2) \quad \text{[Formula 5]}$$

represents a transmission signal including noise and is equivalent to the following relation:

$$\begin{bmatrix} \hat{S}_1(f1) \\ \hat{S}_2(f2) \end{bmatrix} = \begin{bmatrix} S_1(f1) \\ S_2(f2) \end{bmatrix} - \begin{bmatrix} H_1(f1) & H_1(f2) \\ H_1^*(f2) & -H_1^*(f1) \end{bmatrix}^{-1} \begin{bmatrix} n_1(f1) \\ n_1^*(f2) \end{bmatrix} \quad \text{[Formula 6]}$$

When Formula 4 is expanded, $$\begin{bmatrix} \hat{S}_1(f1) \\ \hat{S}_2(f2) \end{bmatrix} = \frac{1}{|H_1(f1)|^2 + |H_1(f2)|^2} \begin{bmatrix} H_1^*(f1) & H_1(f2) \\ H_1^*(f2) & -H_1(f1) \end{bmatrix} \begin{bmatrix} Y_1(f1) \\ Y_1^*(f2) \end{bmatrix}$$ [Formula 7]

is obtained. From this formula, accordingly, $$\hat{S}_1(f_1), \hat{S}_1(f_2)$$ [Formula 8]

may be obtained.

In using two antennas on the transmission side and N number of antennas (N=2 when receiving with two antennas) on the reception side, the received signal is expressed by Formula 9 shown below, in consideration of a maximum ratio synthesis of a reception system.

$$\begin{bmatrix} \hat{S}_1(f1) \\ \hat{S}_2(f2) \end{bmatrix} = \frac{1}{\sum_{j=1}^{N} (|H_j(f1)|^2 + |H_j(f2)|^2)} \sum_{j=1}^{N} \left( \begin{bmatrix} H_j^*(f1) & H_j(f2) \\ H_j^*(f2) & -H_j(f1) \end{bmatrix} \begin{bmatrix} Y_j(f1) \\ Y_j^*(f2) \end{bmatrix} \right)$$ [Formula 9]

In using spatial multiplexing 2×2 of LTE, the received signal is expressed by Formula 10 shown below. Y represents the received signal, and a subscript thereof represents the reception antenna. H represents the propagation path, and a first parameter and a second parameter represent the transmission antenna and the reception antenna, respectively. S represents the signal having been subjected to the MIMO demodulation, and a subscript thereof represents a stream number. Note that neither a precoding matrix of spatial multiplexing nor a matrix of Large Delay CDD is taken into consideration here.

$$\begin{bmatrix} \hat{S}_1(f1) \\ \hat{S}_2(f2) \end{bmatrix} = \begin{bmatrix} H_{11}(f1) & H_{12}(f1) \\ H_{21}(f2) & H_{22}(f1) \end{bmatrix}^{-1} \begin{bmatrix} Y_1(f1) \\ Y_2(f2) \end{bmatrix}$$ [Formula 10]

Next, an operation of the reception apparatus according to the embodiment of the present invention will be described with reference to a flowchart in FIG. 4.

The reception apparatus, to the received signal in a frequency domain after removal of CP (Cyclic Prefix) and having been subjected to FFT (Fast Fourier Transform), calculates the first channel estimated value of each data stream based on the reference signals of each of the data streams (layers) of the received signal and the known reference signal (step S21) and, based on the first channel estimated value and an orthogonal sequence (predetermined value) as an orthogonal reference signal, calculates values associated with the reference signals of each of the data streams (step S22). Next, the reception apparatus synthesizes the values associated with the reference signals of each of the data streams (step S23) and, based on a result of the synthesizing, calculates a reception weight applied to each of the data streams of each of the reception antennas (step S24), and then carries out antenna synthesis of the radio signal of each of the data streams received by using the reception weight (step S25).

Then, the reception apparatus calculates the second channel estimated value of each of the data streams from a reference signal synthesized (step S26) and, by using the second channel estimated value of each of the data streams, carries out the MEMO demodulation and thus obtains the received data (step S27).

Next, a specific example of the calculation will be described by using a case employing SFBC 2×2 of LTE and a case employing spatial multiplexing 2×2 as examples. The received signal of a reference signal portion of each layer is expressed by Formula 11. The subscripts represent reception antenna element numbers.

$$[Y_{DRS1}(f) \; Y_{DRS2}(f)] = [DRS_1 H_1(f) DRS_2 H_2(f)] + [n_1(f) n_2(f)]$$ [Formula 11]

The first channel estimated value calculator 2, as expressed by Formula 12 shown below, divides the received signal of the reference signal portion of each layer by a known DRS (DL Cell Specific Reference Signal) of each layer, and thus obtains a channel estimated value H' (the first channel estimated value) of each layer (step S21 of FIG. 4).

$$[H_1'(f) \; H_2'(f)] = \left[ \frac{Y_{DRS1}(f)}{DRS_1(f)} \; \frac{Y_{DRS2}(f)}{DRS_2(f)} \right]$$ [Formula 12]

For each layer, the orthogonal sequence (Formula 13 shown below) as the orthogonal reference signal (ORS: Orthogonal Reference Signal) is pre-stored in a storage unit (not shown).

$$ORS_1 = [1 \; 1 \; 1 \; 1 \; 1 \; 1 \; 1 \; 1]$$

$$ORS_2 = [1 \; -1 \; 1 \; -1 \; -1 \; 1 \; -1 \; 1]$$ [Formula 13]

The orthogonal signal sequence multiplier 3, as expressed by Formula 14 shown below, multiplies the channel estimated value H' of each layer obtained by the first channel estimated value calculator 2 at step S21 by the orthogonal sequence (ORS) of each layer (step S22 of FIG. 4).

$$Y'_{ORS1}(f) = H_1'(f) * ORS_1(f)$$

$$Y'_{ORS2}(f) = H_2'(f) * ORS_2(f)$$ [Formula 14]

The signal synthesizer 4, as expressed by Formula 15 shown below, synthesizes (combines) the received signal of a reference signal portion of each layer (step S23 of FIG. 4). At this time, preferably, the signal synthesizer 4 adds at least a reference signal in each layer having the same transmission frequency and proximate to other reference signal in a time axis direction. In the formula, t and f represent a time symbol and a subcarrier number, respectively, and a represents offset to a reference signal position of different antenna ports (see FIG. 2).

$$Y(f) = Y'_{ORS1}(t,f) + Y'_{ORS2}(t \pm \alpha, f)$$ [Formula 15]

Figure 4:
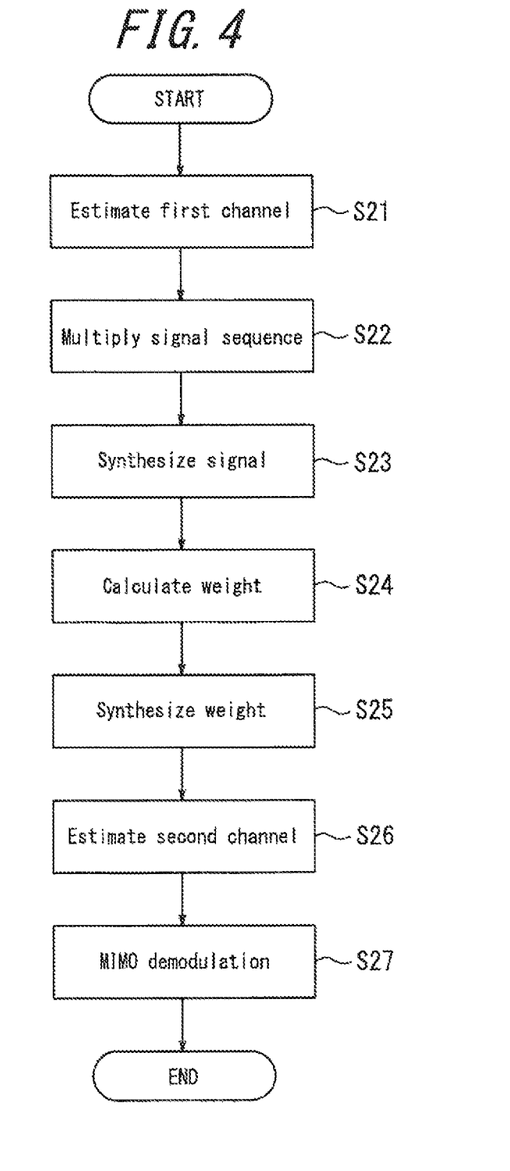
FIG. 4 is a flowchart illustrating an operation of the reception apparatus according to the embodiment of the present invention.

The weight calculator 5 calculates each reception weight of the adaptive array antenna such that null is directed toward different layers (step S24 of FIG. 4). The following formula expresses an example of SMI (Sample Matrix Inversion) scheme. In Formula 16, $W_{st}(k)$ is output by a reception antenna k. A subscript st represents the layer.

$$W_{st} = (Y'^H \; Y')^{-1} \sum_{f=1}^{numORS} \frac{Y'(f)}{ORS_{st}(f)}$$ [Formula 16]

The weight synthesizer 6, as expressed by Formula 17 shown below, carries out the antenna synthesis (null steering) of two received signals Y by using the weight of the adaptive array antenna (step S25 of FIG. 4). Here, UEANT represents the number of antennas of the reception apparatus, and the asterisk (*) represents the complex conjugate.

$$Y_{st}(f) = \sum_{k=1}^{UEANT} Y(f,k) * W_{st}^*(k) \qquad \text{[Formula 17]}$$

The second channel estimated value calculator 7, as expressed by Formula 18 shown below, from the received signal having being subjected to the weight synthesis and the reference signal for each antenna port, obtains a channel estimated value $WH_{st}$ (the second channel estimated value) (step S26 of FIG. 4). A part missing the reference signal will be complemented.

$$WH_{st}(f) = (Y_{st}(f)/DRS(f)) \qquad \text{[Formula 18]}$$

Next, the MIMO demodulator 8 carries out channel equalization. The following formula expresses an example of the channel equalization by a ZF (Zero-Forcing) method.

$$X_{st}(f) = Y_{st}(f)/WH_{st}(f) \qquad \text{[Formula 19]}$$

Here, the null steering of the adaptive antenna system (AAS) suppresses a multiplex wave. Also, noise portion is not taken into account.

In the case employing SFBC, Xst is expressed by the following formula:

$$\begin{bmatrix} S_1(f1) & S_1(f2) \\ -S_1^*(f2) & S_1^*(f1) \end{bmatrix} = \begin{bmatrix} \dfrac{Y_1(f1)}{WH_1(f1)} & \dfrac{Y_2(f1)}{WH_2(f1)} \\ \dfrac{Y_1(f2)}{WH_1(f2)} & \dfrac{Y_2(f2)}{WH_2(f2)} \end{bmatrix} \qquad \text{[Formula 20]}$$

The above formula is rearranged into the following formula:

$$\begin{bmatrix} S_1(f1) & S_1(f2) \\ S_1(f2) & S_1(f1) \end{bmatrix} = \begin{bmatrix} \dfrac{Y_1(f1)}{WH_1(f1)} & \dfrac{Y_2(f1)}{WH_2(f1)} \\ \dfrac{-(Y_1(f2))^*}{(WH_1(f2))^*} & \dfrac{(Y_2(f2))^*}{(WH_2(f2))^*} \end{bmatrix} \qquad \text{[Formula 21]}$$

From the above formula, the MEMO demodulator 8 carries out maximum ratio synthesis of $S_1(f1)$ and $S_1(f2)$.

$$\begin{bmatrix} S_1(f1) \\ S_1(f2) \end{bmatrix} = \begin{bmatrix} \dfrac{Y_1(f1) \cdot (WH_1(f1))^* + (Y_2(f2))^* \cdot (WH_2(f2))}{(WH_1(f1))^* + ((WH_2(f2))^*)^2} \\ \dfrac{Y_2(f1) \cdot (WH_2(f1))^* + (Y_1(f2))^* \cdot (WH_1(f2))}{(WH_2(f1))^* + ((WH_1(f2))^*)^2} \end{bmatrix} \qquad \text{[Formula 22]}$$

In the case employing the special multiplexing, on the other hand, Xst is expressed by the following formula:

$$Xst(f) = Sst(f) \qquad \text{[Formula 23]}$$

In the embodiment described above, the signal synthesizer 4 preferably synthesizes at least the value associated with the first reference signal in the first data stream and the value associated with the second reference signal in the second data stream at the same transmission frequency and proximate to the first reference signal in the time axis direction. However, the signal synthesizer 4 may synthesize at least the value associated with the first reference signal in the first data stream and the value associated with the second reference signal in the second data stream at the same transmission timing and proximate to the first reference signal in the frequency axis direction.

According to the present invention, as described above, the first channel estimated value is obtained from the reference signal in each layer received and the known reference signal, and then the first channel estimated value is multiplied by the orthogonal signal sequence in each layer. Subsequently, the signals of each layer are synthesized. From the orthogonal signal sequence and the synthesized signal, the adaptive array antenna weight is calculated. Next, the data signal and the reference signal received are subjected to the antenna synthesis by using the weight described above, and the second channel estimated value is obtained from the reference signal having been subjected to the synthesis. Then, the MIMO demodulation is carried out by using a result of the channel estimation described above for each layer. Accordingly, null steering may be appropriately carried out to different layers and thus communication quality may be improved.

REFERENCE SIGNS LIST 1 receiver
2 first channel estimated value calculator
3 orthogonal signal sequence multiplier
4 signal synthesizer
5 weight calculator
6 weight synthesizer
7 second channel estimated value calculator
8 MIMO demodulator

The invention claimed is:
1. A reception apparatus having a plurality of reception antennas used in a radio communication system capable of carrying out a Multiple Input Multiple Output (MIMO) communication, the reception apparatus comprising:
  a receiver for receiving, at each of the reception antennas, a radio signal of a plurality of data streams that is transmitted from each of a plurality of transmission antennas of a transmission device and includes reference signals whose transmission timings and transmission frequencies are different from one another;
  a first channel estimated value calculator for calculating a first channel estimated value of each of the data streams based on each of the reference signals and a known reference signal;
  a multiplier for calculating values associated with the reference signals of each of the data streams based on the first channel estimated value and a predetermined value;
  a signal synthesizer for synthesizing the values associated with the reference signals of each of the data streams;
  a weight calculator for calculating a reception weight to each of the data stream of each of the reception antennas based on a result of the synthesizing;
  a weight synthesizer for carrying out, by using the reception weight, antenna synthesis of the radio signal of each of the data streams;
  a second channel estimated value calculator for calculating a second channel estimated value of each of the data streams from the reference signal subjected to the synthesizing; and a demodulator for obtaining received data by carrying out MIMO demodulation by using the second channel estimated value of each of the data streams.

2. The reception apparatus according to claim 1, wherein the signal synthesizer synthesizes at least a value associated with a first reference signal of a first data stream and a value associated with a second reference signal of a second data stream having the same transmission frequency and proximate to the first reference signal in a time axis direction.

3. The reception apparatus according to claim 1, wherein the signal synthesizer synthesizes at least a value associated with a first reference signal of a first data stream and a value associated with a second reference signal of a second data stream having the same transmission timing and proximate to the first reference signal in a frequency axis direction.

4. The reception apparatus according to claim 1, wherein the MIMO communication employs an Space Frequency Block Coding (SFBC) scheme or a spatial multiplexing scheme.

5. The reception apparatus according to claim 1, wherein the predetermined value is a value representing an orthogonal sequence as an orthogonal reference signal corresponding to each of the data streams.

6. A reception method of a reception apparatus having a plurality of reception antennas used in a radio communication system capable of carrying out a Multiple Input Multiple Output (MIMO) communication, the reception method comprising:

a step of receiving, at each of the reception antennas, a radio signal of a plurality of data streams that is transmitted from each of a plurality of transmission antennas of a transmission device and includes reference signals whose transmission timings and transmission frequencies are different from one another;

a step of calculating a first channel estimated value of each of the data streams based on each of the reference signals and a known reference signal;

a step of calculating values associated with the reference signals of each of the data streams based on the first channel estimated value and a predetermined value;

a step of synthesizing values associated with the reference signals of each of the data streams;

a step of calculating a reception weight to each of the data streams of each of the reception antennas based on a result of the synthesizing;

a step of carrying out, by using the reception weight calculated, antenna synthesis of the radio signal of each of the data streams;

a step of calculating a second channel estimated value of each of the data streams from the reference signal subjected to the synthesizing; and a step of obtaining received data by carrying out MIMO demodulation by using the second channel estimated value of each of the data streams.

* * * * *